No. 660,006. Patented Oct. 16, 1900.
E. L. DOYEN.
SHUTTER ADAPTED FOR USE IN APPARATUS FOR EXHIBITING OR VIEWING ANIMATED PICTURES.
(Application filed July 18, 1900.)
(No Model.) 2 Sheets—Sheet 1.

UNITED STATES PATENT OFFICE.

EUGÉNE LOUIS DOYEN, OF PARIS, FRANCE.

SHUTTER ADAPTED FOR USE IN APPARATUS FOR EXHIBITING OR VIEWING ANIMATED PICTURES.

SPECIFICATION forming part of Letters Patent No. 660,006, dated October 16, 1900.

Application filed July 18, 1900. Serial No. 24,096. (No model.)

*To all whom it may concern:*

Be it known that I, EUGÉNE LOUIS DOYEN, doctor of medicine, a citizen of the French Republic, residing at Rue Tuccini No. 6, Paris, France, have invented certain new and useful Improvements in Shutters Adapted for Use in Apparatus for Exhibiting or Viewing Animated Pictures, &c., of which the following is a specification.

My invention consists of improvements in shutters adapted for use in apparatus for exhibiting or viewing what are known as "animated pictures" and other pictures or representations, and it provides an arrangement which enables more than one person to view at the same time in stereoscopic relief, through the medium of light projected upon a single screen, copies or duplicate representations of the same image.

In the case most frequently occurring of kinematographic views it is necessary in order that the observer shall receive the impression of viewing relief and continuity in movements that he should look with each eye alternately, and with this object I provide a shutter adapted successively to open and close right and left sight-openings or eyepieces corresponding to each eye of the observer, such opening and closing being synchronous with the movements of the kinematographic pictures as they succeed each other upon the projection-screen.

The following will explain more fully the nature of my invention, which is particularly described hereinafter and illustrated in the accompanying drawings, in which—

Figure 1:
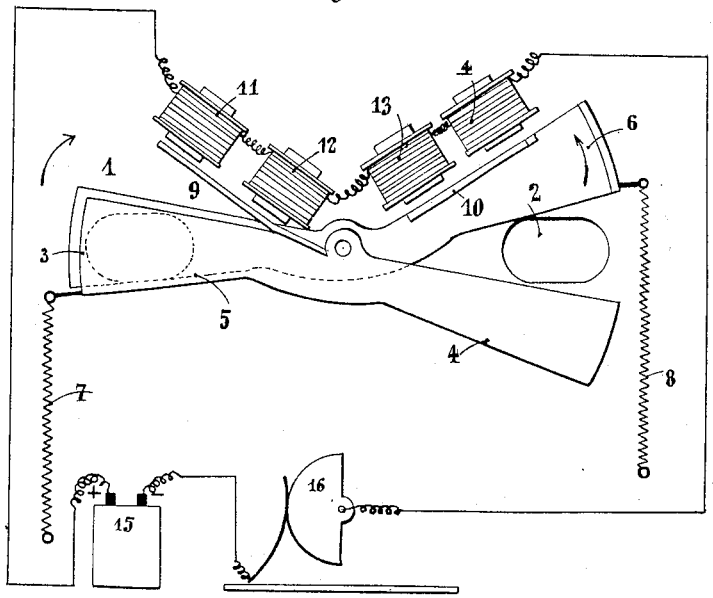
Figure 3:
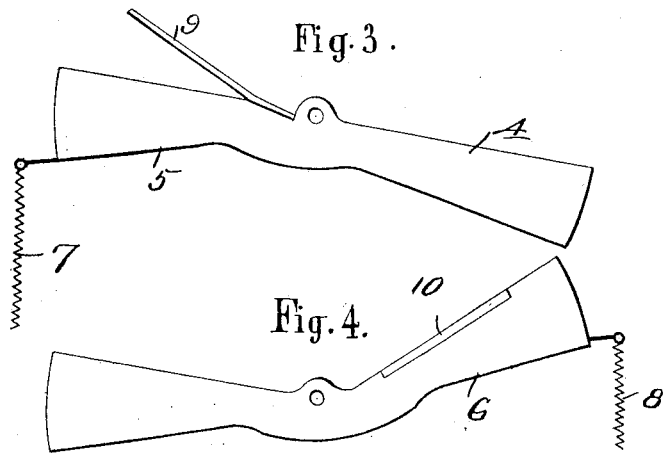
Figure 4:
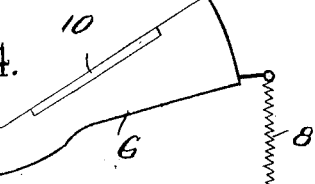
Figure 2:
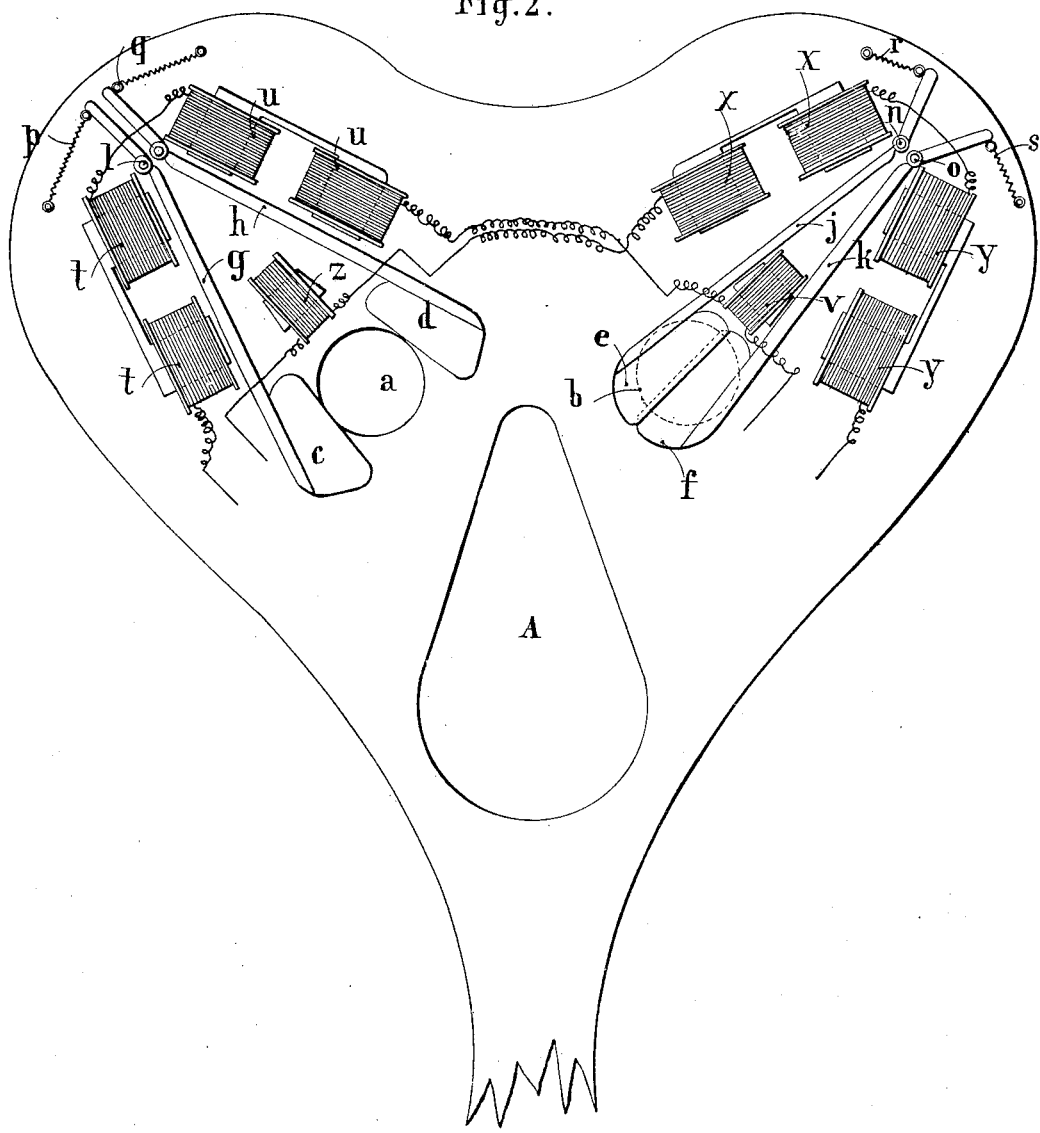

Figure 1 shows an apparatus with the shutter-flaps arranged horizontally, whereas in Fig. 2 these shutter-flaps are arranged diagonally. Figs. 3 and 4 are separate views of the shutter-flaps of Fig. 1.

The shutter has two sight-openings or eyepieces 1 and 2 and two double shutter-flaps 3 4 and 5 6. Both flaps are moved in the symmetric reversed position from that shown in Fig. 1 by means of springs 7 8, and they are provided with two pieces of soft iron 9 10, the piece 9 being slightly set aside from the flap 3, so as to permit the displacements of the flap 5. As the electrical current passes the soft-iron pieces 9 and 10 are attracted by the electromagnets 11 12 and 13 14, which are in series with each other and are connected to a battery 15 and to the rotating switch, current passes through the electromagnets 11 12 and 13 14, and the armatures are attracted in the direction of the arrows, so that the sight-opening or eyepiece 1 is closed and the other sight-opening or eyepiece 2 is opened. When the current is discontinued, the springs 7 8 draw the shutter-flaps to the reversed symmetrical positions from that shown in Fig. 1, the sight-opening or eyepiece 1, which was before closed, being opened and the sight-opening or eyepiece 2 being closed, and so on alternately.

The electromagnets, springs, and shutter-flaps may be arranged in any desired groups or sets and their number may vary. Thus there may be a single shutter-flap controlled by one electromagnet and one spring, or the flap or flaps may be controlled by two opposite electromagnets, with springs adapted to move the shutter flap or flaps back to the dead-point, or there may be two or even four shutter-flaps each mounted on a separate pivot and the flaps be arranged diagonally instead of horizontally to facilitate rapid motion.

Fig. 2 shows an arrangement with diagonal shutter-flaps, wherein *a* and *b* are the two sight-openings, and *c d e f* the four shutter-flaps, which are carried by the soft-iron pieces *g h i j*, pivoted separately on the axis *l m n o*.

To extensions of the armatures beyond their pivot-points are secured springs *p q r s*, which will bring the shutter-flaps together when the action of the electromagnets is discontinued. In proximity to each set of flaps, on the right and left, respectively, are electromagnets *t t u u z* for the sight-opening *a* and *x x y y v* for the opening *b*. These electromagnets are connected in such a manner that when the left-hand object-lens of the projecting apparatus is open the current passes through the electromagnets *t u v*. The sight-opening or eyepiece *a* is opened, and the soft-iron pieces *g h* are attracted so as to be brought in position of Fig. 2 and the other sight-opening or eyepiece *b* closed. By the action of the springs *r s* the shutter-flaps *e f* are returned in the position of Fig. 2 and retained in such position by the attraction of the electromagnet *v* between the armatures, which serves to prevent any vibration.

The electric connections (not illustrated on the drawings, for more clearness) pass into the apparatus, in the lower part of which there is provided an aperture A, affording room for the nose of the observer, so as to enable the observer to bring his eyes nearer to the sight-openings or eyepieces $a$ and $b$.

When the right-hand objective of the projecting apparatus opens, the left-hand objective having just been closed, the current is sent through the electromagnets $x\ x\ y\ y\ z$, so that the right-hand sight-opening or eyepiece $b$ opens and the other sight-opening $a$ is closed, the shutter-flaps $c\ d$ being moved thereover by the action of the springs $p$ and $q$. As the apparatus has to be held in a vertical position, a very swift motion of the shutter-flaps is insured.

Having now particularly described and ascertained the nature of my invention and the manner in which the same may be performed, I declare that what I claim is—

1. In an apparatus of the character described, a pair of pivoted shutters adapted to alternately open and close viewing-openings, means for effecting the alternate shifting movement of each of said shutters and means for automatically returning said shutters to their initial position, substantially as described.

2. In an apparatus of the character described, a pair of pivoted shutters adapted to alternately open and close viewing-openings, means for electrically effecting the alternate shifting movement of each of said shutters, and means for automatically returning said shutters to their initial position, substantially as set forth.

3. In an apparatus of the character described, a pair of pivoted shutters adapted to alternately open and close viewing-openings, means for effecting the alternate shifting movement of each of said shutters, and a spring for automatically returning said shutters to their initial position, substantially as described.

4. In an apparatus of the character described, a pair of pivoted shutters, adapted to alternately open and close viewing-openings, means to effect the alternate shifting movement of each of said shutters, means to automatically return each of said shutters to its initial position, and means to secure the effective retention of each of said shutters in said initial position, substantially as set forth.

5. In an apparatus of the character described, a pair of pivoted shutters adapted to alternately open and close viewing-openings and equipped as an armature, means to electrically effect the alternate shifting movement of each of said shutters, and means to automatically return said shutters to their initial position, substantially as described.

6. In an apparatus of the character described, pivoted shutters, arranged in pairs, and an electrical means for oscillating the shutters of each pair toward each other to alternately open and close said viewing-openings, and for effecting the movement of one pair of said shutters alternately with that of the other pair of shutters, substantially as set forth.

7. In an apparatus of the character described, pivoted shutters, arranged in pairs, an electrical means for oscillating the shutters of each pair toward each other to alternately open and close said viewing openings, and for effecting the movement of one pair of said shutters alternately with that of the other pair of shutters, and means for automatically returning the shutters to their initial position, substantially as set forth.

8. In an apparatus of the character described, a pair of pivoted spring-actuated shutters adapted to alternately open and close viewing-openings, and equipped as armatures, and electromagnets adapted to energize said armatures, the whole connected up in an electrical circuit, substantially as set forth.

In testimony whereof I have hereunto set my hand in presence of two subscribing witnesses.

EUGÉNE LOUIS DOYEN.

Witnesses:
　EMILE KLOBE,
　EDWARD P. MACLEAN.